United States Patent
Wieclawski

(10) Patent No.: US 7,806,480 B2
(45) Date of Patent: Oct. 5, 2010

(54) LATCH REAR SEAT BACK OPERATION

(75) Inventor: Stanislaw Andrzej Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/180,719

(22) Filed: Jul. 28, 2008

(65) Prior Publication Data
US 2009/0108640 A1   Apr. 30, 2009

(30) Foreign Application Priority Data
Oct. 25, 2007   (DE) .................. 10 2007 051 180

(51) Int. Cl.
B60N 2/36 (2006.01)
B60N 2/20 (2006.01)
B60N 2/30 (2006.01)

(52) U.S. Cl. ................................ 297/378.12

(58) Field of Classification Search ............ 297/378.12
See application file for complete search history.

(56) References Cited

U.S. PATENT DOCUMENTS

| 4,484,776 A | 11/1984 | Gokimoto et al. | |
|---|---|---|---|
| 4,880,264 A | 11/1989 | Yamazaki et al. | |
| 4,900,088 A * | 2/1990 | Bechtle et al. | 297/378.12 |
| 4,904,003 A | 2/1990 | Yamazaki et al. | |
| 5,419,616 A * | 5/1995 | Paetzold | 297/378.12 |
| 5,662,369 A | 9/1997 | Tsuge | |
| 5,741,046 A | 4/1998 | Leuchtmann et al. | |
| 5,879,043 A | 3/1999 | Radue et al. | |
| 5,984,419 A | 11/1999 | Partington et al. | |
| 6,132,000 A | 10/2000 | Tanaka | |
| 6,158,800 A * | 12/2000 | Tsuge et al. | 297/378.12 |
| 6,736,438 B1 | 5/2004 | Wieclawski | |
| 7,134,716 B2 | 11/2006 | Wieclawski | |
| 7,152,923 B2 * | 12/2006 | Charras et al. | 297/378.12 |
| 7,156,461 B2 | 1/2007 | Bolte et al. | |
| 2003/0080601 A1 * | 5/2003 | Charras et al. | 297/378.12 |
| 2004/0100133 A1 | 5/2004 | Wieclawski | |

FOREIGN PATENT DOCUMENTS

DE   20 2005 006 992 U1   9/2006

OTHER PUBLICATIONS

English Abstract corresponding to DE 20 2005 006 992.

* cited by examiner

*Primary Examiner*—Rodney B White
(74) *Attorney, Agent, or Firm*—Brooks Kushman P.C.

(57) ABSTRACT

A vehicle seat for temporarily enlarging trunkspace includes a seat back and a seat bottom. The seat back is positionable in an upright position and a folded position. The seat back at least partially defines a portion of a vehicle storage compartment. In the folded position, the storage compartment is larger and able to hold more items than when the seat back is in the upright position. The vehicle seat is operable by a user with a single hand.

11 Claims, 4 Drawing Sheets

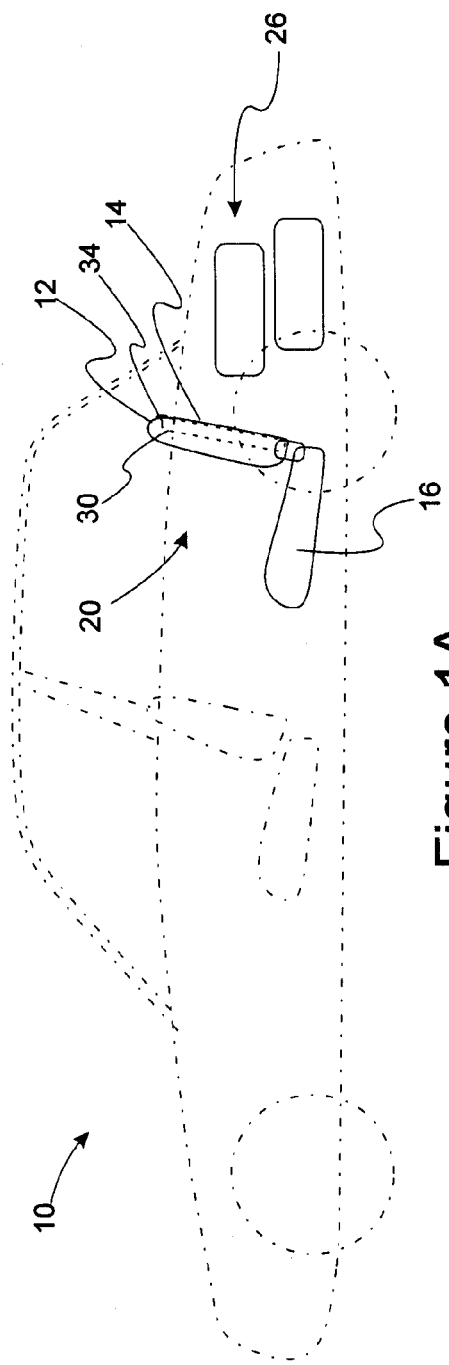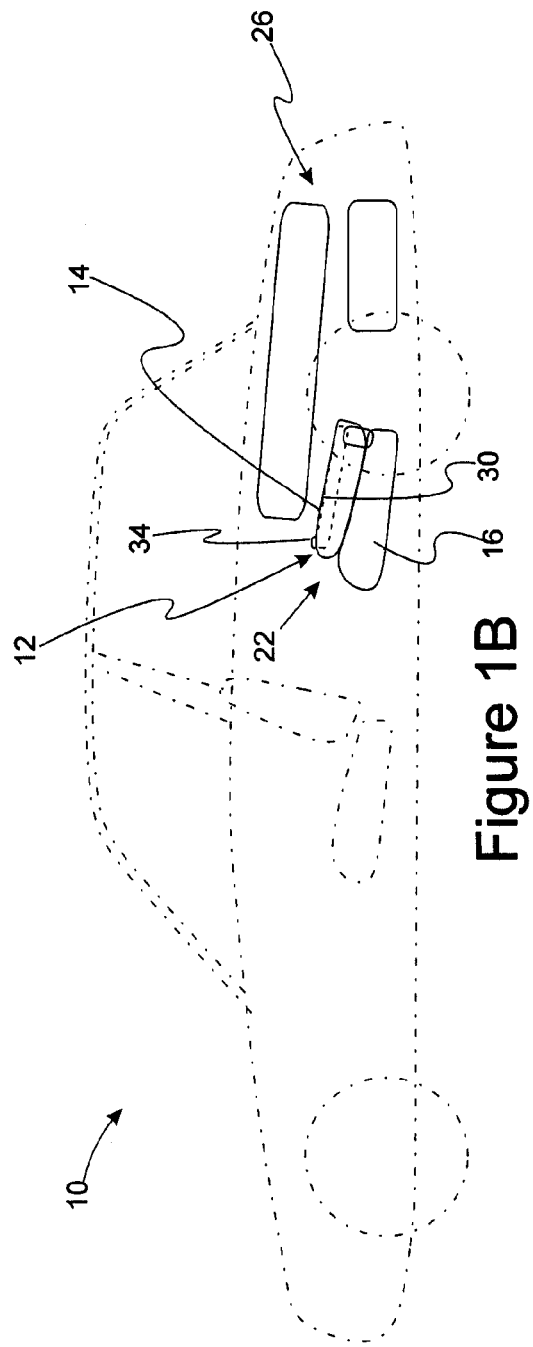

LATCH REAR SEAT BACK OPERATION

CROSS-REFERENCE TO RELATED APPLICATIONS

This application claims priority to German Application No. 10 2007 051 180.0, filed on Oct. 25, 2007, the disclosure of which is hereby incorporated in its entirety.

BACKGROUND OF THE INVENTION

1. Field of the Invention

The present invention relates to foldable seat backs that are operable by a user with a single hand.

2. Background Art

Successful automotive vehicle design requires consideration of numerous diverse design objectives. Components comprising the automobile must often meet criteria ranging from strength and durability to style and comfort. Moreover, increased functionality combined with ease of operation are also important vehicle design characteristics.

One such consideration, is the effective design of small and mid-sized vehicles with improved storage capabilities. In order to temporarily enlarge the trunk space, newer automotive vehicles sometimes incorporate a fold down rear seat back. In these designs the rear surfaces of the seat backs are releasably latched to a cross member of the vehicle body, that runs behind the seat backs, between them and the trunk space. The latches can be released to fold the seat back down by an exterior cable release, accessible from within the trunk space. In some variations, an interior seat back latch release is provided, which can be accessed from the rear seat space. The latch mechanism is typically fixed to the seat back. It is usually desirable that the latches be located, on the seat back, where they can most efficiently retain the seat backs firmly in their raised, latched positions. The optimal seat back design also resists the forces of cargo within the trunk space pushing against the seat backs. In such designs, it is typically necessary for a vehicle user to use both hands in folding the rear seats in order to increase storage space. Although such designs work reasonably well, the ever increasing competitive nature of the automotive industry requires designs with improved functionality.

Accordingly, there is a need for an improved vehicle designed with improved rear storage functionality.

SUMMARY OF THE INVENTION

The present invention solves one or more problems of the prior art by providing in at least one embodiment a vehicle seat that is foldable by a single hand. The vehicle seat of this embodiment includes a seat back and a seat bottom. The seat back is positionable in a design (upright) position and a folded position. The seat back at least partially defines a portion of a vehicle storage compartment. In the folded position, the storage compartment is larger and able to hold more items than when the seat back is in the upright position. Advantageously, the present embodiment is operable by a user with a single hand.

BRIEF DESCRIPTION OF THE DRAWINGS

FIG. 1A is a schematic illustration of a foldable vehicle seat in an upright position;

FIG. 1B is a schematic illustration of a foldable vehicle seat in a folded position;

DETAILED DESCRIPTION OF THE PREFERRED EMBODIMENT(S)

Figure 2:
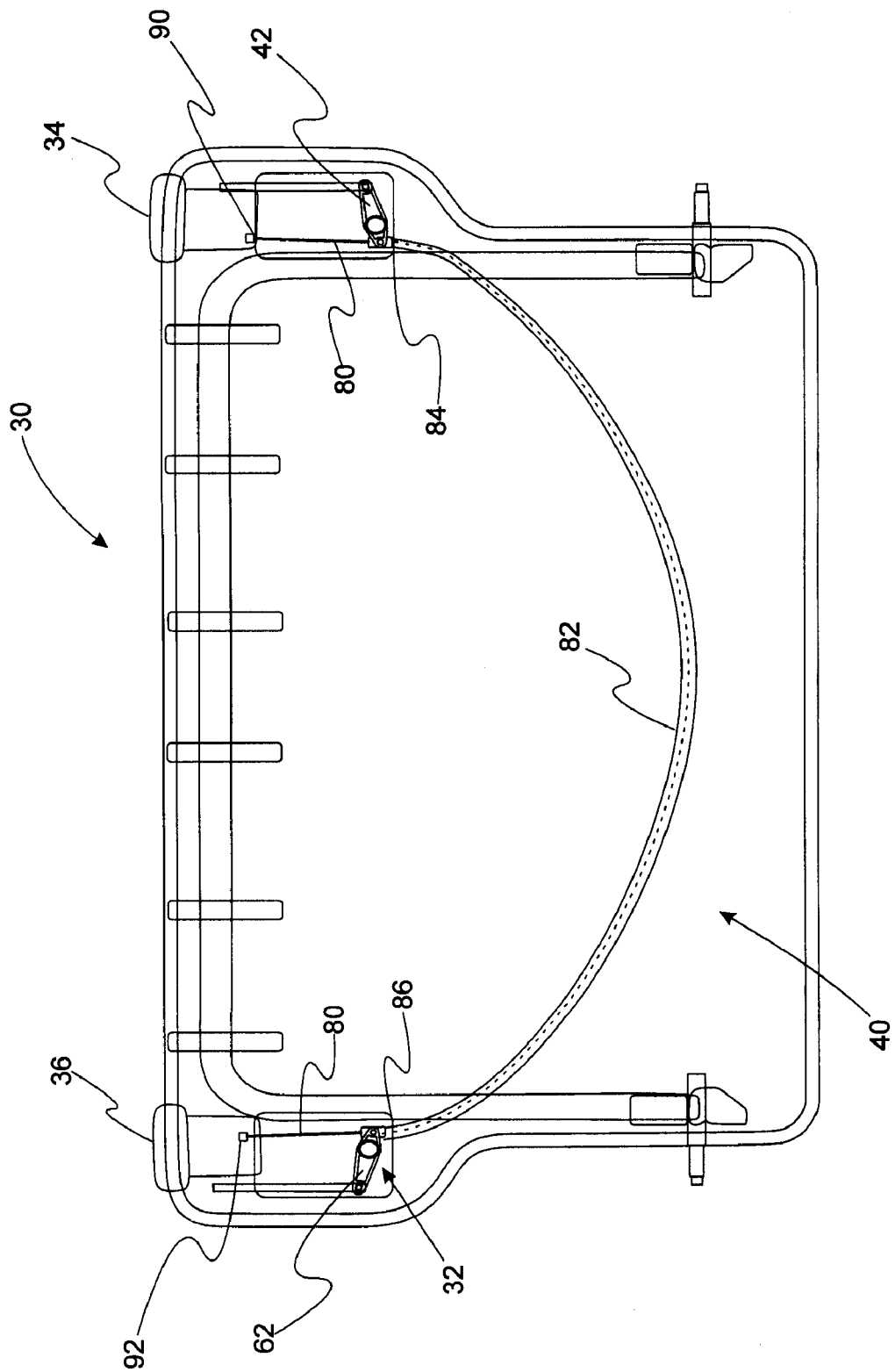
FIG. 2 is a schematic illustration of the seat back frame allowing single handed operation.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIGS. 1A and 1B, a schematic illustration of an embodiment of a foldable automobile seat is provided. FIG. 1A provides a schematic illustration of a vehicle seat in an upright position. FIG. 1B provides a schematic illustration of a vehicle seat in a folded position. Vehicle 10 includes vehicle seat 12. Vehicle seat 12 includes seat back 14 and seat bottom 16. Seat back 14 is positionable in design (upright) position 20 and folded position 22. Seat back 14 at least partially defines a portion of vehicle storage compartment 26. In the folded position 22, storage compartment 26 is larger and able to hold more items than when seat back 14 is in upright position 20. Advantageously, the present embodiment is operable by a user with a single hand.

With reference to FIGS. 1A, 1B, and 2, the latch system of the present embodiment is further illustrated. FIG. 2 is a schematic illustration of the seat back frame allowing single handed operation. Seat back 14 includes seat back frame 30. Seat back frame 30 includes latching system 32 which includes first handle 34 and second handle 36 which are in communication with cable actuation system 40. Operation of either first handle 34 or second handle 36 causes cable actuation system 40 to release seat back 14 so that seat back 14 may be moved to the folded position 22.

Figure 3A:
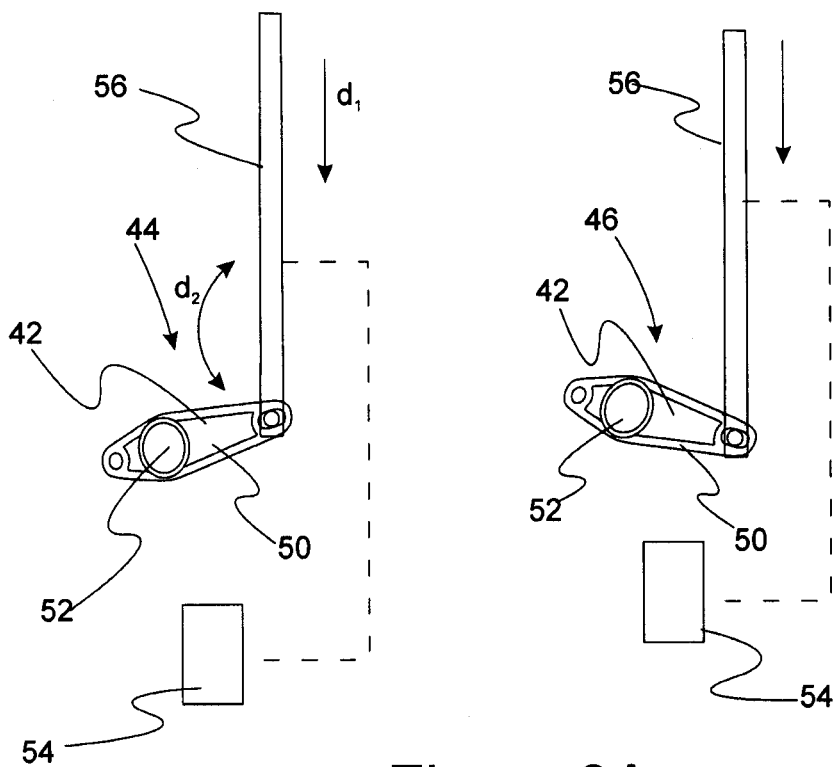
FIG. 3A is a schematic illustration of a first lock actuator which is positionable in a locked and release position.
Figure 3B:
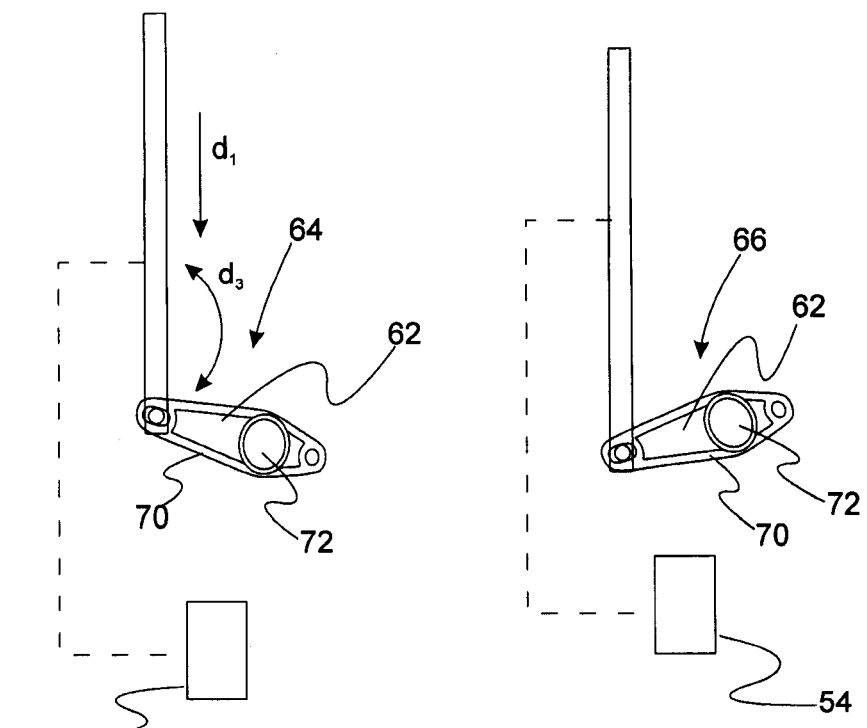
FIG. 3B is a schematic illustration of a second lock actuator which is positionable in a locked and release position.

With reference to FIGS. 2, 3A and 3B, illustration of the operation of cable actuation system 40 is provided. FIG. 3A provides a schematic illustration of a first lock actuator which is positionable in a locked and release position. FIG. 3B provides a schematic illustration of a second lock actuator which is positionable in a locked and release position. Cable actuation system 40 includes first lock actuator 42 that is positionable in first locked setting 44 and first release setting 46. In this variation, first lock actuator 42 includes lever 50 which is pivotable about pivot point 52 along direction $d_2$ when first lock actuator 42 moves between first locked setting 44 and first release setting 46. First lock setting 44 holds seat back 14 in upright position 20 via lock mechanism 54. First release setting 46 allows the seat back to be positioned in the folded position. Actuation member 56 moves along direction $d_1$ when the first lock actuator 42 moves from first locked setting 44 to first release setting 46. Actuation member 56 is in communication with locking mechanism 54 so that the transition to the release position causes release of seat back 14 so that it may be folded.

In a variation of the present embodiment, cable actuation system 40 further includes second lock actuator 62 that is positionable in second locked setting 64 and second release setting 66. In this variation, first lock actuator 62 includes lever 70 which is pivotable about pivot point 72 along direction $d_3$ when first lock actuator 62 moves between first locked setting 64 and first release setting 66. Second lock setting 64 holds seat back 14 in upright position 20. Second release setting 66 also allows the seat back to be positioned in folded position 22. Typically, first lock actuator 42 is set to first release position 46 and second lock actuator 62 is set to second release position 56 in order to allow positioning of seat back 14 to folded position 22.

With reference to FIG. 2, cable actuation system 40 includes cable 80 and cable sheath 82 such that cable 80 is moveable within cable sheath 82. It should be appreciated that in a refinement, the present invention utilizes a single cable. Cable sheath 82 has such that the cable sheath has first end 84 held substantially rigid with respect to first lock actuator 42 and second end 86 held substantially rigid with respect to second lock actuator 62. Similarly, first handle 34 is in communication with first end 90 of cable 80 and second handle 36 is in communication with second end 92 of cable 80.

Figure 4:
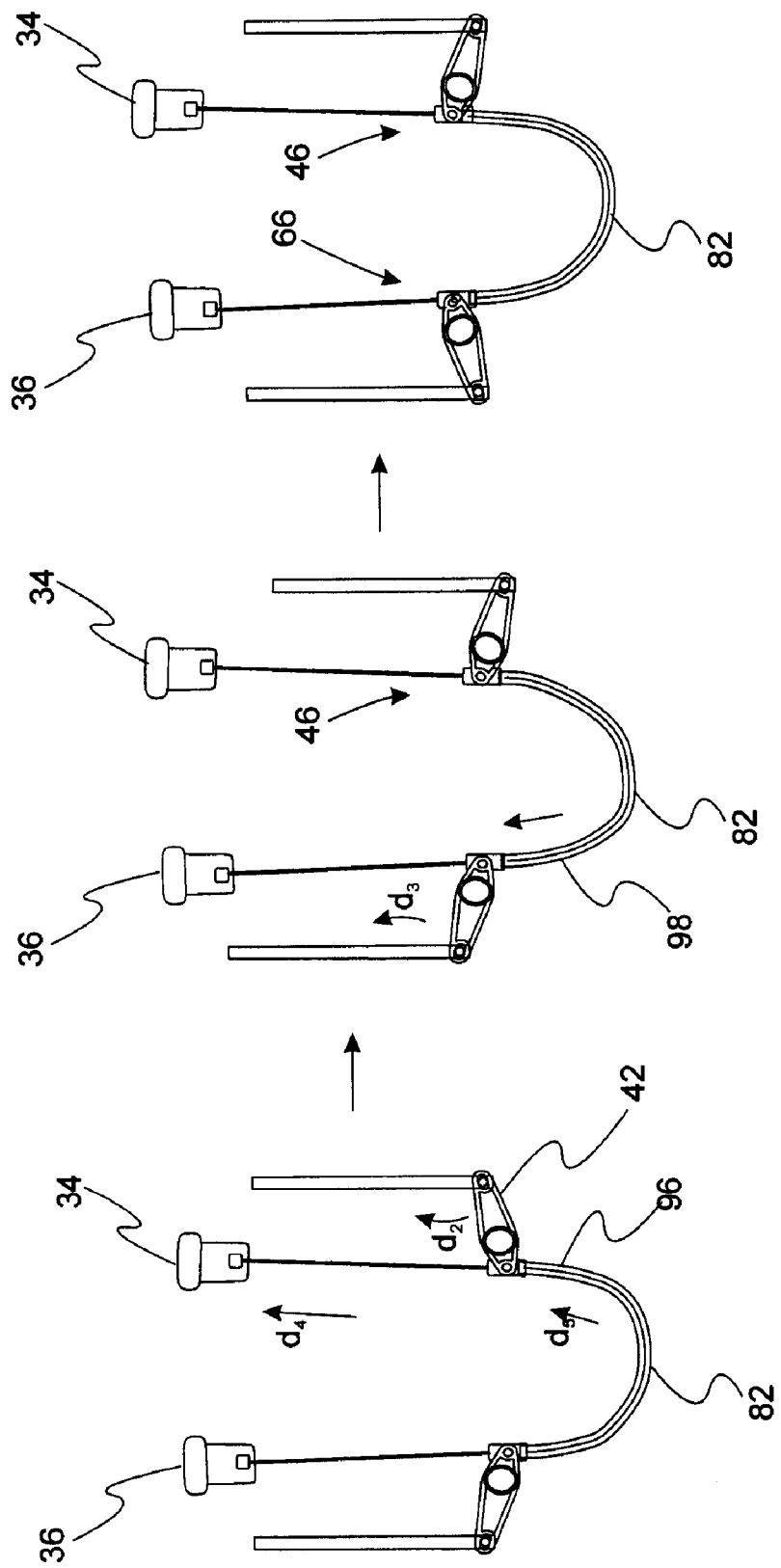
FIG. 4 is a schematic illustration of the operation of the cable actuation system.

With reference to FIGS. 3A, 3B, and 4, operation the actuation system used in various embodiments of the present invention is provided. FIG. 4 is a schematic illustration of the operation of the cable actuation system is provided. Movement of first handle 34 or second handle 36 causes movement of cable 80 such that cable sheath 82 moves in a manner to cause positioning of first lock actuator 42 in first release position 46 and second lock actuator 62 in second release position 66 thereby allowing positioning seat back 14 in folded position 22.

FIG. 4 depicts the movement of first handle 34. Operation of second handle 52 is completely analogous. In this variation, movement of handle 34 along direction $d_4$ pulls cable 80 along the same direction. This in turn causes side 96 of cable sheath 82 to move along direction $d_5$ which is generally in the direction of $d_4$ in a manner to move first lock actuator 42 to release position 46. Because cable sheath is somewhat rigid, side 98 of cable sheath 82 moves along direction $d_6$ thereby causing second lock actuator 62 to move to release position 66. In a variation of the invention, this movement of sides 96, 98 occurs substantially sequentially. In yet another variation of the present invention, handles 34, 36 may have very different release forces. In such a case, the handle with the weaker release force should be operated first.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat operable to be folded by a user with a single hand, the seat back comprising:
    a seat bottom;
    a seat back positionable in an upright position and a folded position;
    a latching system operable to release the seat back so that the seat back is moveable to folded position, the latching system comprising:
    a first handle;
    a second handle; and
    a cable actuation system in communication with the first and second handle, the cable actuation system including a cable and a cable sheath such that the cable is moveable within the cable sheath wherein operation of either the first handle or the second handle causes movement of the cable sheath thereby releasing the seat back so that the seat back may be moved to the folded position.

2. The vehicle seat of claim 1 wherein the cable actuation system includes a first lock actuator that has a first locked setting and a first release setting, the first lock setting holding the seat back in the upright position and a release setting that allows the seat back to be positioned in the folded position.

3. The vehicle seat of claim 2 wherein the cable actuation system further includes a second lock actuator that has a second locked setting and a second release setting, the second lock setting holding the seat back in the upright position and a release setting that allows the seat back to be positioned in the folded position.

4. The vehicle seat of claim 3 wherein the first lock actuator is set to the first release setting and the second lock actuator is set to the second release setting in order to allow positioning of the seat back to the folded position.

5. The vehicle seat of claim 4 wherein the cable actuation system includes a cable and a cable sheath such that the cable is moveable within the cable sheath.

6. The vehicle seat of claim 5 wherein the cable sheath has a first position held substantially rigid with respect to the first lock actuator and a second end held substantially rigid with respect to the second lock actuator.

7. The vehicle seat of claim 6 wherein the first handle is in communication with a first end of the cable and the second handle is in communication with a second end of the cable.

8. The vehicle seat of claim 7 wherein movement of the first handle or the second handle causes movement of the cable such that the cable sheath moves in a manner to cause positioning of first lock actuator in the first release setting and the second lock actuator in the second release setting thereby allowing positioning the seat back in the folded position.

9. The vehicle seat of claim 8 wherein the first lock actuator includes a first lock lever that is operable to pivot to a predetermined position when the cable is moved by either the first or second handle.

10. The vehicle seat of claim 7 wherein positioning in the first lock actuator in the first release setting and the second lock actuator in the second release setting occurs sequentially.

11. The vehicle seat of claim 1 wherein the seat back partially defines a vehicle storage compartment.

* * * * *